United States Patent

[11] 3,623,978

| [72] | Inventors | Ronald A. Boze<br>New Orleans;<br>Otis J. Waguespack, Metairie; Robert W. Kerrigan, New Orleans, all of La. |
|---|---|---|
| [21] | Appl. No. | 25,695 |
| [22] | Filed | Apr. 6, 1970 |
| [45] | Patented | Nov. 30, 1971 |
| [73] | Assignee | Robert-Boze, Inc.<br>New Orleans, La. |

[54] METHOD AND APPARATUS FOR CLARIFYING LIQUIDS
10 Claims, 5 Drawing Figs.

[52] U.S. Cl. ............................................. 210/54,
210/80, 210/283, 210/291
[51] Int. Cl. ............................................. B01d 23/16
[50] Field of Search ................................... 210/52–54,
80, 82, 283, 285, 290, 291

[56] References Cited
UNITED STATES PATENTS

| 988,391 | 4/1911 | Shillington ................... | 210/290 X |
| 1,706,777 | 3/1929 | Eisenhauer ................... | 210/283 |
| 1,742,356 | 1/1930 | Johnson ........................ | 210/290 X |
| 2,092,716 | 9/1937 | Hungerford et al. ........... | 210/283 X |
| 3,171,801 | 3/1965 | Rice et al. ..................... | 210/53 X |
| 3,202,286 | 8/1965 | Smit .............................. | 210/286 |
| 3,534,855 | 10/1970 | Guillerd et al. ................ | 210/290 X |

*Primary Examiner*—Michael Rogers
*Attorney*—Holcombe, Wetherill & Brisebois

ABSTRACT: Method and apparatus for clarifying a liquid passed through a filter bed having relatively fine and relatively coarse layers, in which a polyelectrolyte is introduced into the liquid before it is introduced into the filter to flow from the coarse to the fine layer, migration of coarse to fine particles is prevented by one foraminous barrier and breakup of the fine uppermost layer is prevented by another foraminous barrier.

METHOD AND APPARATUS FOR CLARIFYING LIQUIDS

BACKGROUND OF THE INVENTION

This invention relates to a method and apparatus for clarifying fluids, especially water. Conventional "sand" filters consisting of successive layers of sand and gravel are one of the cheapest means for filtering large volumes of liquid, but are incapable of clarifying water having a turbidity substantially in excess of 15 p.p.m. Mississippi River water, on the other hand, may have a turbidity of several hundred p.p.m.

It has heretofore been suggested that the effectiveness of sand filters could be improved by coating the individual particles of sand with a polyelectrolyte before the filter bed is formed, thereby increasing the tendency of the contaminants in the water to adhere to the said particles, but this requires periodic replacement of the treated filter material. The introduction of polyelectrolytes into the liquid has also been suggested, but only for flocforming purposes, in which the liquid is then retained in a settling tank long enough to permit the coagulated floc which forms to settle out before the liquid is put through a conventional filter.

Clarifiers are large tanks taking up a great deal of space, and not adapted for rapid continuous clarification, since they ordinarily have a maximum rise rate of 1.5 gallons per minute per square foot.

SUMMARY OF THE INVENTION

I have therefore devised a system according to which, as a first expedient, the polyelectrolyte is introduced into the water to be clarified, just before that water is introduced into the filters.

Unfortunately, the mere introduction of polyelectrolyte into water which is then introduced into a conventional downflow filter (in which the water flows first through the finest layers) produces unsatisfactory results in that impurities begin to pass through the filter after it has absorbed from 1.1 to 2.0 pounds of solids per square foot of filter. Once this "breakthrough" has occurred, the bed must be purged, (commonly by driving water and air through it in a reverse direction under pressure). It will be appreciated that while the bed is being purged the filter must be taken off the line, and consequently that the need for frequent purgings renders its use economically impractical.

It was noted that a layer of filtrate or "Schmutzdecke" was formed at the top of the filter, and with the thought that this might be avoided if the water were introduced first to the coarse layers, experiments were then carried out using, as a second expedient, reverse or upflow filtration, with the water travelling through the coarse layers first. The results were no better, ranging from 1.2 pounds per square foot to 1.7 pounds per square foot before breakthrough.

Further investigation, however revealed that the breakthrough occurred for a different reason, and came because the lighter upper layers, which are held in place by the influent pressure in a downflow system tended to break up the fluidize when subjected to the substantial upflow pressures inherent in my process.

It will be appreciated that conventional beds usually go on stream at an operating pressure of 12 inches of mecury, and breakdown at a pressure of 14 inches of mercury. My filters, on the other hand, operate at pressures up to 35 inches of mercury.

The ability of the smallest, lightest, uppermost layers to resist the additional pressure resulting from the higher amount of contaminant without breaking up was therefore enhanced by providing as a third expedient a screen or grid at the top of the uppermost layer.

This simply resulted in frequent breakdowns of the entire system. Extensive investigation revealed that the use of the upflow system at high pressures apparently exaggerates another problem of sand bed filters, and this is the problem of migration of large-diameter material from the lower layers into the upper layers. This tends to produce "pipes" of large-diameter low-resistance material in the upper layers. Once these pipes form, they tend to enlarge rapidly, and fluid passing through these pipes is inadequately filtered. The bed must then be rebuilt.

All sand bed filters have this tendency, but in conventional downflow filters the bed is operated with fluid flow in one direction and purged with fluid flowing in the opposite direction, whereas upflow filters are both operated and purged in the same direction. Furthermore applicant's filters are operated at much higher pressures. The initial result of using the grid at the top of the bed was accordingly the rapid formation of "pipes" of large diameter material in the layers of small diameter material so that the beds had to be rebuilt with a frequency rendering them clearly uneconomic.

This led to adoption of the fourth and final expedient, the emplacement of a grid between the lighter and heavier layers of the bed having apertures large enough to avoid interference with the free flow of fluid, but small enough to prevent upward migration of the larger material.

To sum up, applicant has found that a sand and gravel filter may be effectively used to clarify water or other liquids if, but only if, a combination of all four of the following expedients is used:
1. Addition of polyelectrolyte to the influent.
2. Reverse feeding of the influent to the filter bed so that it travels from coarse to fine.
3. Prevention of breakup of the fine layer by imposing a grid thereon.
4. Preventing migration of coarse material into fine layers by separating these two types of material.

None of these expedients, with the possible exception of the addition of polyelectrolyte to the influent, is individually original with applicant, but the combination of the four makes possible a result heretofore unattainable, namely the continuous clarification of high turbidity influent by means of a sand and gravel filter.

Certain terms used herein will now be defined:

Suitable "polyelectrolytes" may be cationic, anionic, or nonionic and include:

The polymerized acrylamides sold by the Dow Chemical Co. under the trademark "Separan NP10" and responding generally to the formulae.

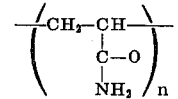

The synthetic high molecular weight polymer sold by the Dow Chemical Co. under the trademark "Separan AP30" and responding generally to the formula:

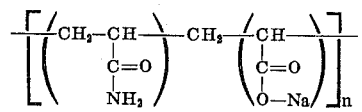

Nalcolite, sold by Nalco, and others sold by Clagon, Rhom & Haas, American Cyanamid, Hercules Inc. and Union Carbide Corp.

"Fine media" consist of particulate material, usually less than 3 mm. in diameter, which is fluidized during purging but not during clarification.

"Coarse media" consist of particulate material usually more than three-eighths in. in diameter which is not fluidized at any time.

"Purging" is the step of forcing a relatively clean fluid through the filter, moving form coarse to fine, so as to drive out the contaminants accumulated during its operation as a clarifier. Frequently a gas, such as air, is introduced along with a relatively clean liquid.

"Downflow system" means a system in which influent passes first through the finer media.

"Upflow system" means a system in which influent passes first through the coarser media.

"Breakdown" means that the filter has begun to pass effluent which has not been clarified to a required degree (usually "adequate clarification") which the filter has attained during normal operation.

"Adequate clarification" is considered to be the reduction of turbidity to not more than 1.0 p.p.m. J.T.U.

"Sand filter" or "sand and gravel filter" has been used to identify the most common type of filter comprising separate layers of particulate material, which layers vary in fineness. These layers need not, however, be made of sand or gravel, but may be made of any particulate material reasonably inert to the liquid being filtered and the contaminants carried thereby.

In order that the invention may be better understood, a preferred embodiment thereof will now be described, purely by way of illustration and example, with reference to the accompanying drawings, in which:

FIG. 5 is a detail view showing an inlet nozzle in elevation.

Like reference numerals indicate like parts throughout the several views.

Figure 1:
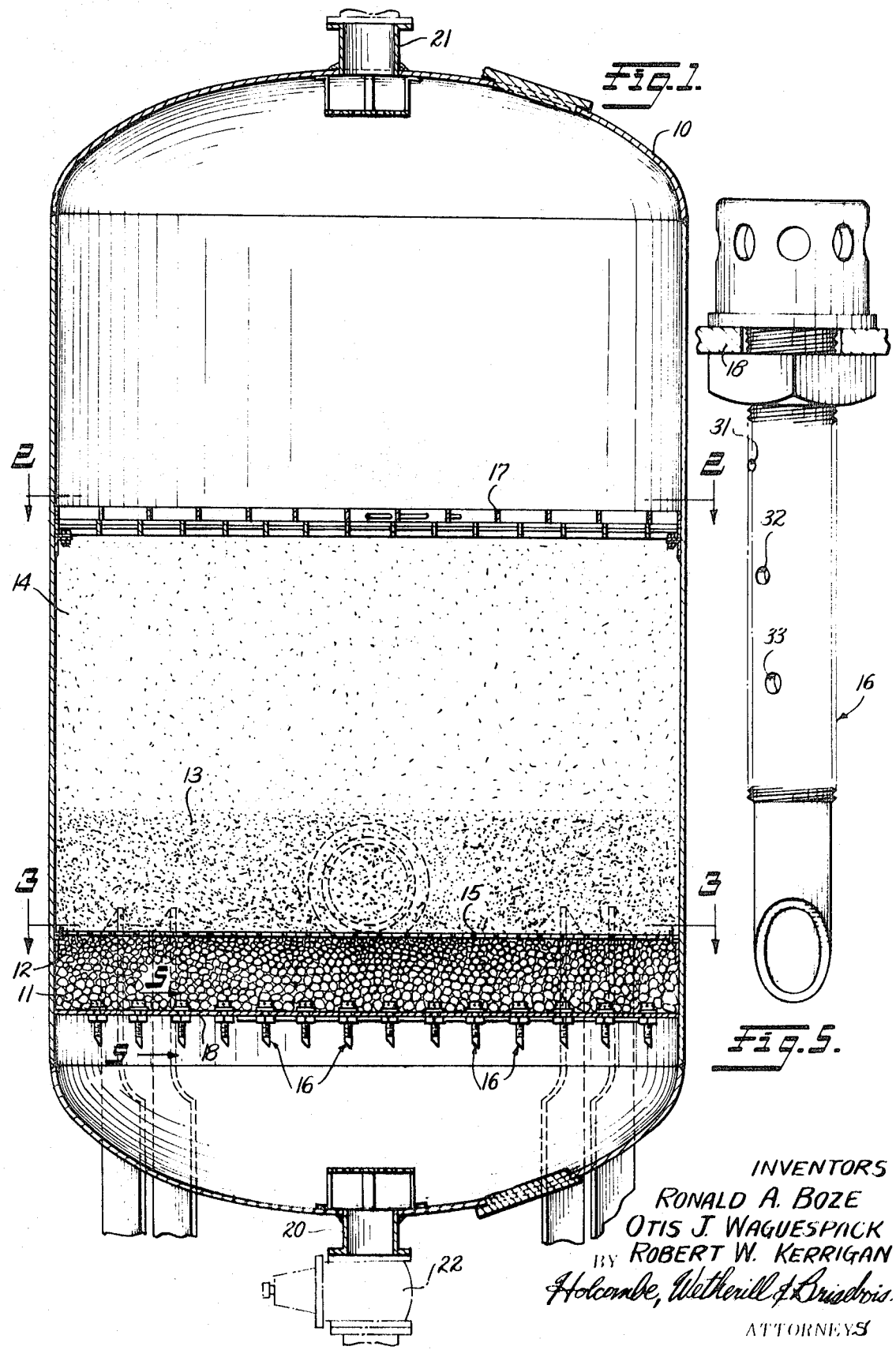
FIG. 1 is a vertical section through a filter according to my invention.
Figure 2:
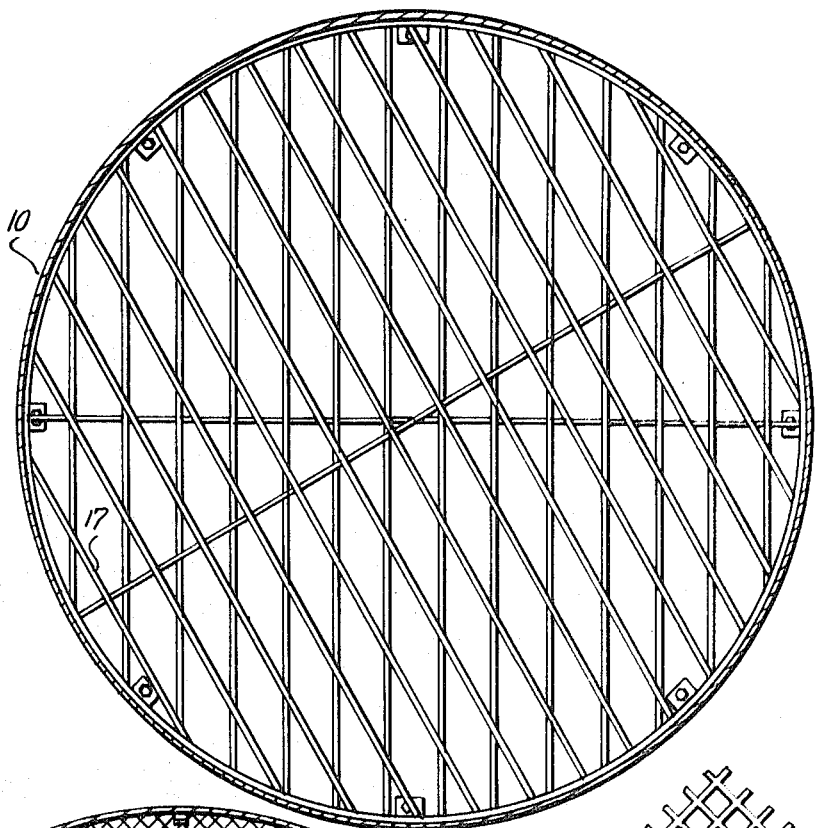
FIG. 2 is a horizontal sectional view of the filter along the line 2—2 of FIG. 1 with the media omitted.
Figure 3:
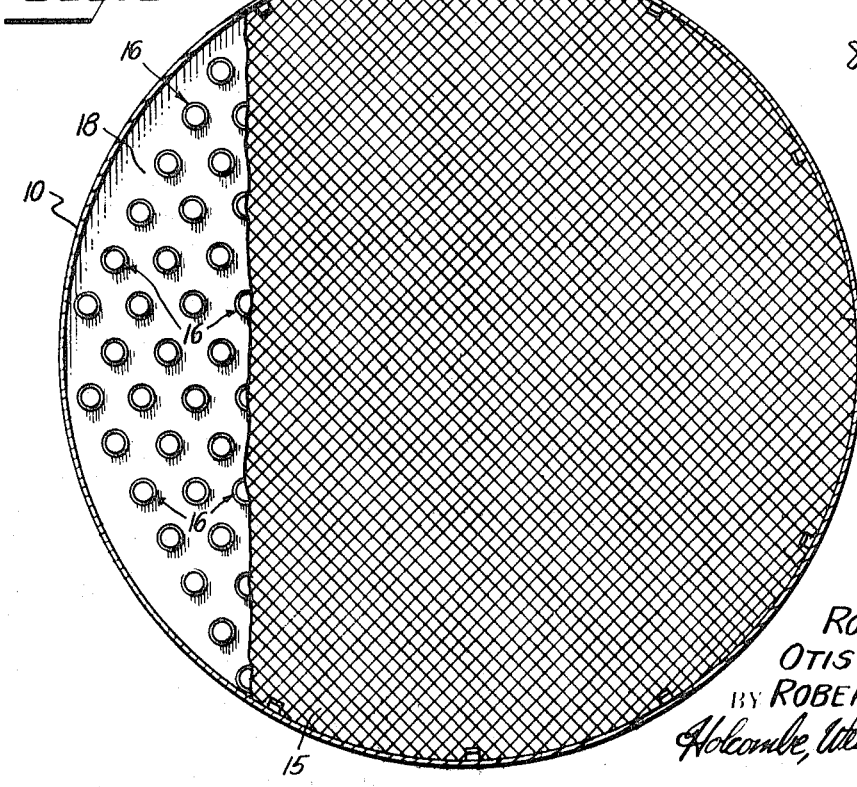
FIG. 3 is a horizontal sectional view taken along the line 3—3 of FIG. 1.
Figure 4:
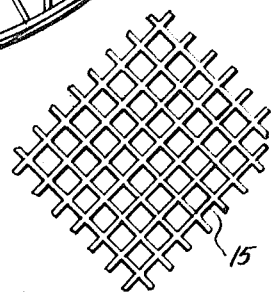
FIG. 4 is an enlarged detail view showing a part of the screen separating the fine and coarse media.

Referring now to FIG. 1, it will be seen that a representative filter according to the invention comprises a tank 10 in which may be 12 feet in diameter, holding a lowermost layer 11, 6 inches thick, consisting of gravel or other coarse media having a diameter of between one-half and 2 inches, with an average diameter of 1.25 inches, a second layer 12, 6 inches, thick, consisting of gravel having a diameter of three-sixteenths to five-sixteenths inches, with an average diameter of eleven thirty-seconds inches, a third layer 13, 12 inches thick, consisting of sand the particles of which have a diameter of 2–3 mm. with an average diameter of 2.5 mm. and a fourth or top layer 14, 50 inches thick, consisting of sand particles having a diameter of 1–2 mm. with an average diameter of 1.5 mm. A screen 15 between the second and third layers has a total open cross-sectional area not less than that of the nozzles 16 through which fluid to be filtered is supplied to the filter, and from 9 to 70 percent of the cross-sectional area of the tank. The individual openings in the screen 15 are too small to freely pass the individual pieces of gravel in the layer 12, and should preferably not be much larger than the particles of sand in the layer 13, although they may be slightly smaller. A grid 17 on or near the top of the upper layer 14 prevents cracking of the bed during the filtering, and should also have an open area greater than the effective cross-sectional area of the nozzles 16. This grid may consist of superimposed sets of parallel bars spaced one-eighth inch to three-eights inch apart at an angle of 30°–90° with respect to each other, having a total open area between 9 and 70 percent of the cross-sectional area of the tank. The nozzles 16 depend from a floor 18 which supports the lowermost gravel layer 11. Electrolyte is introduced at the rate of 0.1 to 10.0 p.p.m. into the water being supplied to the filter through the inlet 20, and continuously withdrawn therefrom through an outlet 21. The inlet may be provided with a valve 22 which regulates the rate of flow at which the water is admitted. The pressure is gradually increased from a minimum of 12 inches of mercury when the filter is first brought "on stream" to about 35 inches when the filter must be shut down and purged. The rate of flow during purging is much higher than during filtration, and during this purging the sand must be substantially fluidized. It will accordingly be appreciated that unless migration of the gravel into the fluidized sand is prevented, repeated purging will lead to breakdown of the bed.

Water feed is pumped into the vessel through the pipe located at the center of the bottom head. From thence the water passes through the perforated distribution plate 18 through tubular nozzles 16 as shown in FIG. 1. Each nozzle projects downward from the perforated plate.

The nozzles are located symmetrically so that there are 3.8 nozzles per square foot of area on the plate. Each nozzle has a calculated open area such that it can accommodate a duty radius of 3 inches, necessary to provide uniform address of flow to the coarse media substrates. Each successive stratum will enhance the uniformity of flow approach to the fine media.

Each nozzle contains three holes 31, 32, 33, spaced axially along the nozzle. Each hole diameter is larger than the preceding one with the smallest hole closest to the lower surface of the plate. The function of these holes is as follows: During the air sparge, which is the initial part of the regeneration cycle or "purge", it is necessary that the air volume be distributed with equal uniformity onto the bed. In the event that the plate is not level across its diameter during the introduction of air, the uppermost hole diameters at any elevated plate section can only accept a precalculated quantity of air. (The sum of the precalculated volumes that each upper hole in each nozzle can pass is less than the total volume injected into the system, therefore air is forced into every nozzle resulting in a symmetrical uniform air pattern.)

Operation of such a bed on an upflow basis, using water to which an electrolyte has been added, permits operation for a much longer time between shutdowns for purging, as has been hereinbefore pointed out, due to the cooperative effect of features enumerated.

Use of the upflow system permits the effective use of a larger part of the bed for contaminant holding purposes. In downflow systems most of the filtering is done at the top of the bed, at which point a matting of solids soon accumulates so as to require frequent purging. Such systems are unsatisfactory where the turbidity of the input is more than 30 p.p.m. My system, will, on the other hand produce a filtrate having a turbidity of 1 p.p.m. or less from an influent having a turbidity of from 10 to 600 p.p.m. The upflow system makes practical the addition of polyelectrolyte directly to the water, since it makes the entire filter bed available for the attachment of contaminants by the electrolyte instead of merely using the top of the bed to strain out floc formed by the electrolyte. Upflow operation is in turn made practical by the two screens which prevent breaking up of the fluidizable part of the bed during filtration and migration of the gravel part of the bed during purging.

While the combination of upflow operation and the two grids could be used without the electrolyte, any attempt to use the upflow system with electrolyte, but without both the upper and lower grids results in breakdown of the bed within a few cycles.

A bed according to my invention will hold 7 pounds of contaminant per square foot before purging is required, as against 2½ pounds per square foot for a bed which is identical, except for the four expedients hereinbefore pointed out. A bed not utilizing my invention will go on stream at an operating pressure of 12 inches of mercury and breaks down when sufficient contaminants have been accumulated to raise the operating pressure to 14 inches of mercury. My clarification system, on the other hand can be operated until the contaminants have increased the required pressure to as much as 35 inches of mercury. In general, an increase in pressure of as much as 50 percent, e.g. from 12 to 18 mm. of mercury, represents a substantial increase in the amount of contaminants retained per square foot of filter bed, and a point beyond which it is not believed any comparable filters have been successfully operated over a commercially satisfactory basis. My system is ordinarily operated until the pressure reaches a predetermined value above 18 mm. of mercury, but not ordinarily greater than 35 mm., although it is probably possible to exceed the latter figure by careful and more expensive design. This upper limit, is therefore, accepted in practice for economic rather than physical reasons.

The results of several test runs which illustrate the advantages of the invention and the essential nature of the four expedients will now be given:

1. Random tests, using polyelectrolyte, flowing downward instead of upward:

| Run No. | Pounds of contaminant per sq. ft. of filter at breakthrough |
|---|---|
| 1 | 1.6 |
| 2 | 1.1 |
| 3 | 2.0 |
| 4 | 1.7 |

2. Without adding polyelectrolyte, but using a downflow system, it was impossible to obtain adequate clarity (1 p.p.m) from water in excess of 30 p.p.m. Conventional filters using the following a clarifying tank, have an accepted holding capacity of less than 1 pound per square foot.

3. Tests using polyelectrolyte and upflow without grid above fine particulate material, but with separating screen between fine and coarse layers:

| Run No. | Pounds of contaminant per sq. ft. of filter at breakthrough |
|---|---|
| 1 | 2.7 |
| 2 | 3.1 |
| 3 | 3.0 |
| 4 | 2.3 |

4. Tests with grid above fine material, using polyelectrolyte, and upflow, without separating screen between fine and coarse layers:

This arrangement worked well for 3 to 5 days with too purges per day, holding 8 or 9 pounds of contaminant per square foot, at the beginning of this period, but with this figure falling gradually. By the end of the fifth day, the results were as follows:

| Run No. | Pounds of contaminant per sq. ft. of filter at breakthrough |
|---|---|
| 1 | 3.0 |
| 2 | 3.1 |
| 3 | 3.6 |
| 4 | 2.0 |

5. Tests with grid above fine material using polyelectrolyte and upflow, with separating screen between fine and coarse layers:

| Run No. | Pounds of contaminant per sq. ft. of filter at termination of test |
|---|---|
| 1 | 9.2 |
| 2 | 8.4 |
| 3 | 8.4 |
| 4 | 8.4 |

There was no breakthrough. Tests were simply terminated when substantially improved results had been clearly obtained. Similar results were still obtained after the filter had been operated for several months, with purging twice a day.

From the foregoing it will be seen that the best results obtained using a combination of any three of applicants expedients, was a retention of 3.6 pounds/sq. ft.—less than twice the best result (2.0 pounds/sq.ft.) achieved by simply adding electrolyte to water introduced to a conventional downflow filter. On the other hand, the synergistic result of utilizing all four expedients was a retention of at least 8.4—more than four times the best result achieved by simply adding electrolyte to water supplied to a downflow filter.

What is claimed is:

1. Method of clarifying a liquid which comprises the steps of introducing into said liquid a polyelectrolyte adapted to cause particles suspended in said liquid to attach themselves to other particles, passing said liquid successively upward through a lower layer of relatively coarse particulate material and an upper layer of relatively fine particulate material while preventing substantial migration of said coarse material into said fine material by maintaining between said fine and coarse material a lower screen having openings too small to freely pass the individual particles of relatively coarse material, and preventing breakup of said layer of relatively fine material by imposing thereon an upper screen having openings so small as to prevent such breaking up under a liquid pressure less than 50 percent in excess of that required to advance said liquid through said layers of particulate material when clean.

2. Method as claimed in claim 1 according to which said electrolyte is introduced into said liquid at the rate of 0.1 to 10.0 p.p.m.

3. Method of operating a filter containing a layer of particulate material sufficiently fine to become fluidized during purging but not during filtering, and a layer of particulate material too coarse to become fluidized during purging which method comprises the steps of introducing into a liquid requiring said clarification a polyelectrolyte adapted to cause particles suspended in said liquid to adhere to other particles, passing said liquid upwardly through said filter, proceeding from the coarse layer to the fine layer, preventing substantial migration of said coarse material into said fine material by maintaining between said fine and coarse material a lower screen having openings too small to freely pass the individual particles of relatively coarse material, and preventing breakup of said layer of fine material, while unfluidized, by imposing thereon an upper screen having openings so small as to prevent such breakup under a liquid pressure less than 50 percent greater than that required to advance the liquid to be clarified through said filter when clean.

4. Method as claimed in claim 3 in which each of said screens has a total open area less than 70 percent of the total cross-sectional area of a layer but at least as great as the total cross-sectional area through which fluid is afforded access to said coarse layer.

5. Method as claimed in claim 4 comprising the step of interrupting the filtering liquid to be clarified when the pressure required to force it through said layers reaches a predetermined point more than 50 percent in excess of that required to force it through said layers when clean, forcing a purging fluid through said layers in the same direction as that of said liquid to be clarified at a rate of flow sufficient to fluidize only said layer of fine particulate material until said layers are substantially cleansed of filtrate, and then reintroducing said fluid to be clarified.

6. Method as claimed in claim 3 in which said liquid is passed through said filter until the pressure across said filter reaches at least said 50 percent greater pressure but is still insufficient to fluidize said layer of fine particulate material and said filter is then purged by forcing both a gas and a liquid through said bed in the same direction as the liquid to be clarified at a pressure which is sufficient to fluidize said layer of fine particulate material.

7. Clarifier including a filter bed comprising a series of layers of particulate material substantially chemically inert to the liquid to be clarified and to its contaminants, at least one layer consisitng of particulate material so fine that it becomes fluidized during purging and at least one layer consisting of particulate material too coarse to become fluidized during purging and positioned beneath said layer of fine material, a lower screen between said layers of fine and coarse materials having openings too small to permit upward migration of said coarse material, an upper screen atop said layer of fine material having openings sufficiently larger than any of said fine particles to permit breakup of said layer of fine material and subsequent passage of fine material therethrough when said layer of fine material is fluidized during purging but small enough to prevent breakup of said layer of fine material, while unfluidized, at any liquid pressure less than 50 percent greater than that required to advance a liquid to be clarified through said filter bed when said bed is clean, means for introducing a liquid to be clarified beneath said layer of coarse material, and means for withdrawing said liquid from above said layer of fine material.

8. Clarifier as claimed in claim 7 comprising a perforated plate supporting said layer of coarse material and a plurality of nozzles extending through said plate through which a liquid to be clarified and a purging fluid may be introduced during clarification and purging respectively.

9. Clarifier as claimed in claim 8 in which each nozzle is provided with a series of axially spaced radial openings.

10. Clarifier as claimed in claim 7 in which said each of said screens has a total open area between 9 and 70 percent of the cross-sectional area of said filter bed.

* * * * *

UNITED STATES PATENT OFFICE
CERTIFICATE OF CORRECTION

Patent No. 3,623,978          Dated November 30, 1971

Inventor(s) RONALD A. BOZE, OTIS J. WAGUESPACK, ROBERT W. KERRIGAN

It is certified that error appears in the above-identified patent and that said Letters Patent are hereby corrected as shown below:

Column 3, line 39, cancel "eleven" and substitute --nine--.

Column 4, lines 65, 71 and 72, cancel "mm." and substitute --inches--.

Signed and sealed this 30th day of May 1972.

(SEAL)
Attest:

EDWARD M. FLETCHER, JR.          ROBERT GOTTSCHALK
Attesting Officer                Commissioner of Patents